(12) United States Patent
Shaw et al.

(10) Patent No.: US 11,683,334 B2
(45) Date of Patent: Jun. 20, 2023

(54) CYBERSECURITY SYSTEM FOR SERVICES OF INTERWORKING WIRELESS TELECOMMUNICATIONS NETWORKS

(71) Applicant: T-Mobile USA, Inc., Bellevue, WA (US)

(72) Inventors: Venson Shaw, Kirkland, WA (US); Gaviphat Lekutai, Kirkland, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 254 days.

(21) Appl. No.: 17/138,608

(22) Filed: Dec. 30, 2020

(65) Prior Publication Data
US 2022/0210179 A1    Jun. 30, 2022

(51) Int. Cl.
    *H04L 9/40* (2022.01)
(52) U.S. Cl.
    CPC ................ *H04L 63/1433* (2013.01)
(58) Field of Classification Search
    CPC .................... H04L 63/1433; H04W 12/121
    See application file for complete search history.

(56) References Cited

U.S. PATENT DOCUMENTS

| | | | |
|---|---|---|---|
| 8,201,257 B1 | 6/2012 | Andres et al. | |
| 8,584,234 B1 * | 11/2013 | Sobel | H04L 63/1416 726/22 |
| 8,606,320 B2 | 12/2013 | Hummelholm et al. | |
| 8,621,637 B2 | 12/2013 | Al-Harbi et al. | |
| 8,918,883 B1 | 12/2014 | Boyle et al. | |
| 9,432,924 B1 | 8/2016 | Singh et al. | |
| 10,387,657 B2 | 8/2019 | Belfiore et al. | |
| 11,412,386 B2 * | 8/2022 | Shaw | H04W 12/122 |
| 11,431,746 B1 * | 8/2022 | Shaw | H04L 63/20 |
| 2012/0180133 A1 | 7/2012 | Al-Harbi et al. | |
| 2012/0185945 A1 | 7/2012 | Andres et al. | |
| 2012/0278886 A1 * | 11/2012 | Luna | H04L 63/1408 726/22 |
| 2016/0219024 A1 * | 7/2016 | Verzun | H04L 9/34 |
| 2018/0220291 A1 | 8/2018 | Fares | |
| 2019/0052665 A1 | 2/2019 | Mahieu et al. | |
| 2019/0058987 A1 | 2/2019 | Raleigh | |
| 2019/0182655 A1 | 6/2019 | Gupta et al. | |
| 2021/0392477 A1 * | 12/2021 | Taft | H04L 67/56 |
| 2022/0103588 A1 * | 3/2022 | Shaw | H04L 63/1433 |

(Continued)

FOREIGN PATENT DOCUMENTS

| | | | | |
|---|---|---|---|---|
| CN | 105763562 B | | 4/2019 | |
| CN | 110300091 A | * | 10/2019 | ............. H04L 41/14 |

(Continued)

*Primary Examiner* — Sarah Su
(74) *Attorney, Agent, or Firm* — Perkins Coie LLP

(57) ABSTRACT

A system obtains security data of interconnected networks. The visibility of the security data is asymmetric for each interconnected network relative to the other. The security data is continuously stored and used in real-time or near real-time to identify services of the interconnected networks that require safeguards against a potential cyberattack. The interworking system determines a security parameter that relates the security data to the potential cyberattack and communicates the security parameter to the interconnected networks. The interconnected networks can safeguard against the potential cyberattack based on the security parameter.

20 Claims, 7 Drawing Sheets

(56) References Cited

U.S. PATENT DOCUMENTS

| | | | |
|---|---|---|---|
| 2022/0103596 A1* | 3/2022 | Shaw | G06Q 20/123 |
| 2022/0104020 A1 | 3/2022 | Rajput et al. | |
| 2022/0141254 A1* | 5/2022 | Oswal | H04L 63/0263 |
| | | | 726/1 |
| 2022/0210651 A1* | 6/2022 | Shaw | H04W 8/06 |
| 2022/0210656 A1* | 6/2022 | Shaw | H04W 12/08 |

FOREIGN PATENT DOCUMENTS

| | | | | |
|---|---|---|---|---|
| CN | 111885210 A * | 11/2020 | | |
| DE | 102010037740 A1 | 5/2011 | | |
| DE | 102018001968.4 B3 | 8/2019 | | |
| EP | 1535164 A2 | 6/2005 | | |
| EP | 1559008 A1 | 8/2005 | | |
| EP | 1899875 A2 | 3/2008 | | |
| EP | 2284775 A2 | 2/2011 | | |
| EP | 2785003 A1 * | 10/2014 | H04L 63/1466 | |
| EP | 2498198 B1 | 5/2017 | | |
| EP | 3171572 A1 | 5/2017 | | |
| EP | 3304307 A1 | 4/2018 | | |
| EP | 3180891 B1 | 11/2019 | | |
| JP | 2005135239 A | 5/2005 | | |
| JP | 2008511054 A | 4/2008 | | |
| JP | 4369724 B2 | 9/2009 | | |
| JP | 2010182095 A | 8/2010 | | |
| JP | 4942835 B2 | 3/2012 | | |
| JP | 5304243 B2 | 7/2013 | | |
| JP | 2014503099 A | 2/2014 | | |
| JP | 2014132455 A | 7/2014 | | |
| JP | 5955863 B2 | 6/2016 | | |
| JP | 2016218964 A | 12/2016 | | |
| JP | 2017525055 A | 8/2017 | | |
| JP | 6392170 B2 | 8/2018 | | |
| JP | 6624692 B2 | 12/2019 | | |
| KR | 20080030130 A | 4/2008 | | |
| KR | 100955281 B1 | 4/2010 | | |
| KR | 101292640 B1 | 8/2013 | | |
| KR | 101310487 B1 | 9/2013 | | |
| KR | 20160141457 A | 12/2016 | | |
| WO | WO-2005050378 A2 * | 6/2005 | G06F 21/10 | |
| WO | 2006033727 A2 | 3/2006 | | |
| WO | 2008004498 A1 | 1/2008 | | |
| WO | 2008036381 A2 | 3/2008 | | |
| WO | 2010019460 A2 | 2/2010 | | |
| WO | 2010019461 A2 | 2/2010 | | |
| WO | 2012096916 A1 | 7/2012 | | |
| WO | 2012123970 A2 | 9/2012 | | |
| WO | 2013109374 A1 | 7/2013 | | |
| WO | 2015070466 A1 | 5/2015 | | |
| WO | 2016025226 A1 | 2/2016 | | |
| WO | 2016170551 A1 | 10/2016 | | |
| WO | 2017137778 A1 | 8/2017 | | |
| WO | 2018049437 A2 | 3/2018 | | |
| WO | 2018098294 A1 | 5/2018 | | |
| WO | 2020060503 A1 | 3/2020 | | |

* cited by examiner

CYBERSECURITY SYSTEM FOR SERVICES OF INTERWORKING WIRELESS TELECOMMUNICATIONS NETWORKS

BACKGROUND

In telecommunications, 5G is the fifth-generation technology standard for cellular networks, the successor to 4G networks, which provide connectivity to most current mobile phones. Like its predecessors, the service area of 5G networks is divided into geographical areas called cells. The wireless devices in a cell are connected to internet and telephone networks by radio waves through a local antenna in the cell. A main advantage of 5G networks is greater bandwidth, yielding higher download speeds, eventually up to 10 gigabits per second (Gbit/s). Due to the increased bandwidth, 5G networks can also serve as general internet service providers (ISPs) and will make possible new applications in internet-of-things (IoT) and machine-to-machine (M2M) areas.

5G introduces a new era of cybersecurity threats because, among other things, it enables communications and access of vastly higher volumes and types of data relative to prior generation technologies, and thus broadens the possibility of cyberattacks. For example, the risk of data breaches or leaks of personal data can increase because user credentials that are readily communicated on networks can be stolen and used to gain access to private information available through applications and services. Thus, victims can readily have their personal or private information like social security numbers, addresses, date of births, driver license numbers, and other personal data compromised.

Although most interconnected devices on networks are safe, dependable, and reliable, 5G wireless networks create a greater number of vulnerabilities to, for example, malware compared to other communication networks. Malware refers to any software that is intentionally designed to cause damage to a computer, server, client, or network. A wide variety of malware types exist, including viruses, worms, Trojan horses, ransomware, spyware, adware, rogue software, and scareware. These vulnerabilities and others cannot be addressed with conventional techniques because widespread deployment of security resources across diverse networks and devices is cost-prohibitive, resource intensive, and impractical. Thus, effective and targeted safeguards are desired.

BRIEF DESCRIPTION OF THE DRAWINGS

Embodiments of the present technology will be described and explained through the use of the accompanying drawings.

Figure 1:
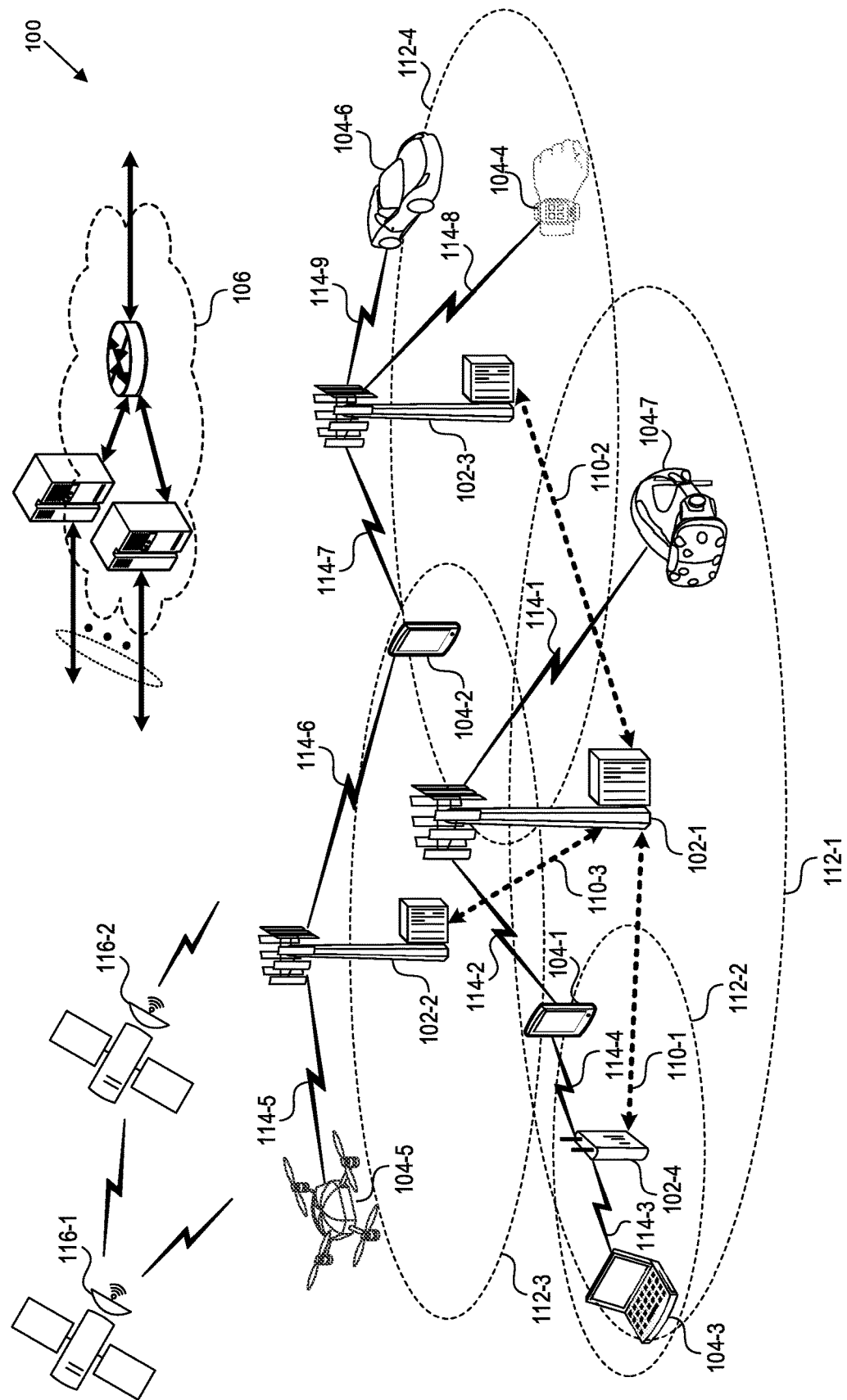
FIG. 1 is a block diagram that illustrates a wireless communications system that can implement aspects of the present technology.

Various features of the technologies described herein will become more apparent to those skilled in the art from a study of the Detailed Description in conjunction with the drawings. Embodiments are illustrated by way of example and not limitation in the drawings, in which like references may indicate similar elements. While the drawings depict various embodiments for the purpose of illustration, those skilled in the art will recognize that alternative embodiments may be employed without departing from the principles of the technologies. Accordingly, while specific embodiments are shown in the drawings, the technology is amenable to various modifications.

DETAILED DESCRIPTION

The disclosed technologies address problems that arise from information asymmetry between multiple wireless service providers or operators of interconnected wireless telecommunications networks. In one example, information asymmetry between networks creates security vulnerabilities to support roaming wireless devices ("roaming devices"). That is, the asymmetry gives rise to security vulnerabilities enabled or caused by a shared service or roaming devices.

An interconnection refers to a physical or logical connection between networks. The interconnection of two different networks supports end-to-end service interoperability. The interworking networks refers to the functionality of two networks to communicate to each other thereby enabling services to be delivered for wireless devices across the two networks. Roaming refers to a wireless device (e.g., mobile phone) being used outside the range of its home wireless network while in a visited network. roaming, a network subscriber can automatically make and receive voice calls, send and receive data, or access other services, including home data services, when travelling outside a geographical coverage area of its home network, by means of using a visited network. A "home network" refers to the wireless network in which the subscriber is registered. A "visited network" refers to a wireless network that a subscriber roams temporarily and is outside the bounds of the home network. For example, if a subscriber travels beyond a home network's transmitter range, the subscriber's wireless device can automatically hop onto a visited network's service, if available.

A network is equipped to support security measures for its own services and subscriber devices but not necessarily the services or devices of other networks. For example, inbound roaming refers to roaming from the perspective of the visited network's operator, which is not fully aware of security risks associated with the home network of a roaming device. Outbound roaming refers to roaming from the perspective of the home network's operator, where the home operator is aware of security risks of its own subscribers that roam in visited networks.

In one example, the disclosed technologies can mitigate the problems that arise from information asymmetry between networks by collecting security data from different sources, standardizing that data into a vulnerability-risk threat (VRT) model with a common format. The resulting VRT data reveals security vulnerabilities and capabilities that can be shared among operators to compensate for the information asymmetry of interconnected networks or with roaming devices. The VRT security model can characterize network traffic according to VRT parameters: a vulnerability relating to a state or condition of a network susceptible to a cyberattack; a risk relating to a scope or potential harm of a cyberattack; and a threat relating to a probability or source of a cyberattack.

A cybersecurity system ("system") for interconnected networks can process VRT information related to services or roaming devices and recommend actions (e.g., block, quarantine, or redirect network traffic) to compensate for the asymmetry of security data. In one example, the cybersecurity system acts as a mediator or information broker that can exchange VRT information to improve the security of interworking services or for roaming devices.

The technologies thus create safeguards for interconnected networks from cyberattacks by addressing the effects of asymmetric security data. Additional techniques are described in the assignee's related applications including U.S. patent application Ser. No. 17/138,646, filed Dec. 30, 2020, titled "Cybersecurity System for Inbound Roaming in a Wireless Telecommunications Network," U.S. patent application Ser. No. 17/138,674, filed Dec. 30, 2020, titled "Cybersecurity System for Outbound Roaming in a Wireless Telecommunications Network," U.S. patent application Ser. No. 16/874,649, filed May 14, 2020, titled "5G Cybersecurity Protection System Using Personalized Signatures," U.S. patent application Ser. No. 17/021,870, filed Sep. 15, 2020, titled "Visual Voicemail Centralized Authentication System for Wireless Networks," U.S. patent application Ser. No. 16/945,592, filed Jul. 31, 2020, titled "Cached Entity Profiles at Network Access Nodes to Re-Authenticate Network Entities," U.S. patent application Ser. No. 16/945,637, filed Jul. 31, 2020, titled "Connectivity Scheduler for NB-IOT Devices," U.S. patent application Ser. No. 17/007,782, filed Aug. 31, 2020, titled "Wireless Network That Discovers Hotspots for Cyberattacks Based on Social Media Data," U.S. patent application Ser. No. 16/849,158, filed Apr. 15, 2020, titled "On-Demand Security Layer for a 5G Wireless Network," and U.S. patent application Ser. No. 16/921,765, filed Jul. 6, 2020, titled "Security System for Managing 5G Network Traffic," each of which are incorporated by reference in their entireties for all purposes.

Wireless Communications System

FIG. 1 is a block diagram that illustrates a wireless telecommunication system 100 ("system 100") in which aspects of the disclosed technology are incorporated. The system 100 includes base stations 102-1 through 102-4 (also referred to individually as "base station 102" or collectively as "base stations 102"). A base station is a type of network access node (NAN) that can also be referred as a cell site, a base transceiver station, or a radio base station. The system 100 can include any combination of NANs including an access point, a radio transceiver, a gNodeB (gNB), NodeB, eNodeB (eNB), Home NodeB, a Home eNodeB, or the like. In addition to being a WWAN base station, a NAN can be a WLAN access point, such as an IEEE 802.11 access point.

The NANs of a network formed by the system 100 also includes wireless devices 104-1 through 104-7 (referred to individually as "wireless device 104" or collectively as "wireless devices 104") and a core network 106. The wireless devices 104-1 through 104-8 can correspond to or include network entities that are capable of communication using various connectivity standards. For example, a 5G communication channel can use millimeter waver (mmW) access frequencies of 28 GHz or more. In some implementations, the wireless device 104 can operatively couple to a base station 102 over an LTE/LTE-A communication channel, which is referred to as a 4G communication channel.

The core network 106 can provide, manage, or control security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate, either directly or indirectly (e.g., through the core network 106), with each other over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The system 100 can include base stations of different types (e.g., macro and/or small cell base stations). In some implementations, there can be overlapping geographic coverage areas 112 for different service environments (e.g., Internet-of-Things (IOT), mobile broadband (MBB), vehicle-to-everything (V2X), machine-to-machine (M2M), machine-to-everything (M2X), ultra-reliable low-latency communication (URLLC), machine-type communication (MTC)).

In some examples, the system 100 can include a 5G network and/or an LTE/LTE-A network. In an LTE/LTE-A network, the term eNB is used to describe the base stations 102 and, in 5G or new radio (NR) networks, the term gNBs is used to describe the base stations 102 that include mmW communications. The system 100 can form a heterogeneous network in which different types of base stations provide coverage for various geographical regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow unrestricted access by wireless devices with service subscriptions with the network provider. As indicated earlier, a small cell is a lower-powered base station, as compared with a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices with service subscriptions with the network provider. A femto cell covers a relatively small geographic area (e.g., a home) and can provide restricted access by wireless devices having an association with the femto cell (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

As illustrated, the wireless devices 104 are distributed throughout the system 100, where each wireless device 104 can be stationary or mobile. A wireless device can be referred to as a mobile station, a subscriber station, a mobile unit, a subscriber unit, a wireless unit, a remote unit, a handheld mobile device, a remote device, a mobile subscriber station, an access terminal, a mobile terminal, a wireless terminal, a remote terminal, a handset, a mobile client, a client, or the like. Examples of a wireless device include user equipment (UE) such as a mobile phone, a personal digital assistant (PDA), a wireless modem, a handheld mobile device (e.g., wireless devices 104-1 and 104-2), a tablet computer, a laptop computer (e.g., wireless device 104-3), a wearable (e.g., wireless device 104-4). A wireless device can be included in another device such as, for example, a drone (e.g., wireless device 104-5), a vehicle (e.g., wireless device 104-6), an augmented reality/virtual reality (AR/VR) device such as a head-mounted display device (e.g., wireless device 104-7), an IoT device such as an appliance in a home (e.g., wireless device 104-8), or a wirelessly connected sensor that provides data to a remote server over a network.

A wireless device can communicate with various types of base stations and network equipment at the edge of a network including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in system 100 include uplink (UL) transmissions from a wireless device 104 to a base station 102, and/or downlink (DL) transmissions, from a base station 102 to a wireless device 104. The downlink transmissions may also be called forward link transmissions while the uplink transmissions may also be called reverse link transmissions. Each communication link 114 includes one or more carriers, where each carrier can be a signal composed of multiple sub-carriers (e.g., waveform signals of different frequencies) modulated according to the various radio technologies described above. Each modulated signal can be sent on a different sub-carrier and carry control information (e.g., reference signals, control channels), overhead information, user data, etc. The communication links 114 can transmit bidirectional communications using FDD (e.g., using paired spectrum resources) or TDD operation (e.g., using unpaired spectrum resources). In some embodiments, the communication links 114 include LTE and/or mmW communication links.

In some embodiments of the system 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that may take advantage of multi-path environments to transmit multiple spatial layers carrying the same or different coded data.

In some embodiments, the wireless devices 104 are capable of communicating signals via the LTE network and an mmW system (e.g., as part of a 5G/NR system). Accordingly, the wireless device 104 can communicate with the base station 102 over an LTE link and/or with a transmission point (TP) or base station (BS) over an mmW link. In another example, at least one of the base stations 102 communicates signals via the LTE network and the mmW system over one or more communication links 114. As such, a base station 116 may be referred to as an LTE+mmW eNB or gNB or as an LTE+mmW TP/BS/mmW-BS.

5G Network Functions

Figure 2:
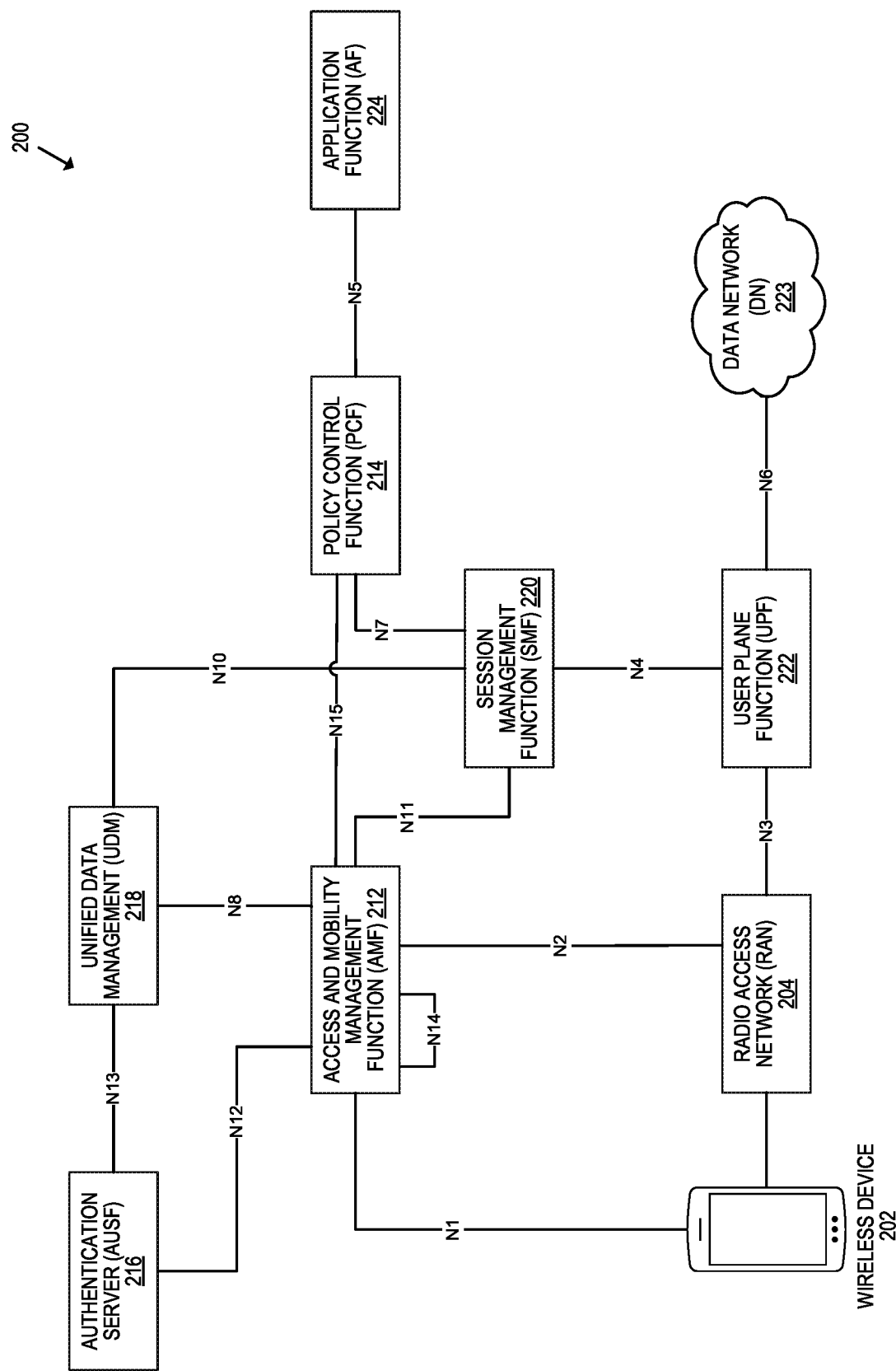
FIG. 2 is a block diagram that illustrates an architecture of network functions of a 5G network that can implement aspects of the present technology.

FIG. 2 is a block diagram that illustrates an architecture of network functions of a 5G network that can implement aspects of the present technology. A network entity such as a wireless device 202 can access the 5G network via a RAN 204, through a NAN such as a gNB. The architecture of the network functions 200 includes an authentication server function (AUSF) 216, a unified data management (UDM) 218, an access and mobility management function (AMF) 212, a policy control function (PCF) 214, a session management function (SMF) 220, and a user plane function (UPF) 222. The PCF 214 can connect with one or more application functions (AFs) 224. The UPF 222 can connect with one or more data networks (DNs) 223. The interfaces N1 through N15 define the communications and/or protocols between each function or component, as described in relevant standards. The UPF 222 is part of the user plane and the AMF 212, SMF 220, PCF 214, AUSF 216, and UDM 218 are part of the control plane. The UPFs can be deployed separately from control plane functions and the network functions of the control plane are modularized such that they can be scaled independently.

A UDM introduces the concept of user data convergence (UDC) that separates the user data repository (UDR) for storing and managing subscriber information from the frontend that processes the subscriber information. The UDM can employ UDC under 3GPP TS 22.101, which supports a layered architecture that separates user data from application logic in 3GPP systems. The UDM 218 is associated with a database (not shown) that can contain profile data for subscribers and/or other data that can be used to authenticate network entities. Given the large number of wireless devices (e.g., IoT devices) that can connect to the 5G network, the UDM 218 contains voluminous amounts of data that is accessed to authenticate network entities.

For example, each time that a wireless device seeks to connect to a 5G network, a UDM receives an indication of a connection request and authorizes the connection request by authenticating the wireless device or associated subscriber based on profile data stored at the UDM. The UDM can then communicates the authorization to the NAN so that the wireless device can access the 5G network through the NAN.

Cybersecurity Systems for Asymmetric Security Information

Aspects of the disclosed technology include cybersecurity systems ("systems") that collect and/or mediate exchanges of security-related information or data between interconnected networks that support wireless devices. In general, robust security management requires extensive knowledge of network capabilities and vulnerabilities. As such, a network operator can regularly monitor, store, publish, or update security data online or send the security data to a system that curates information. The system can then selectively communicate or broadcast the curated security information to networks.

Figure 3:
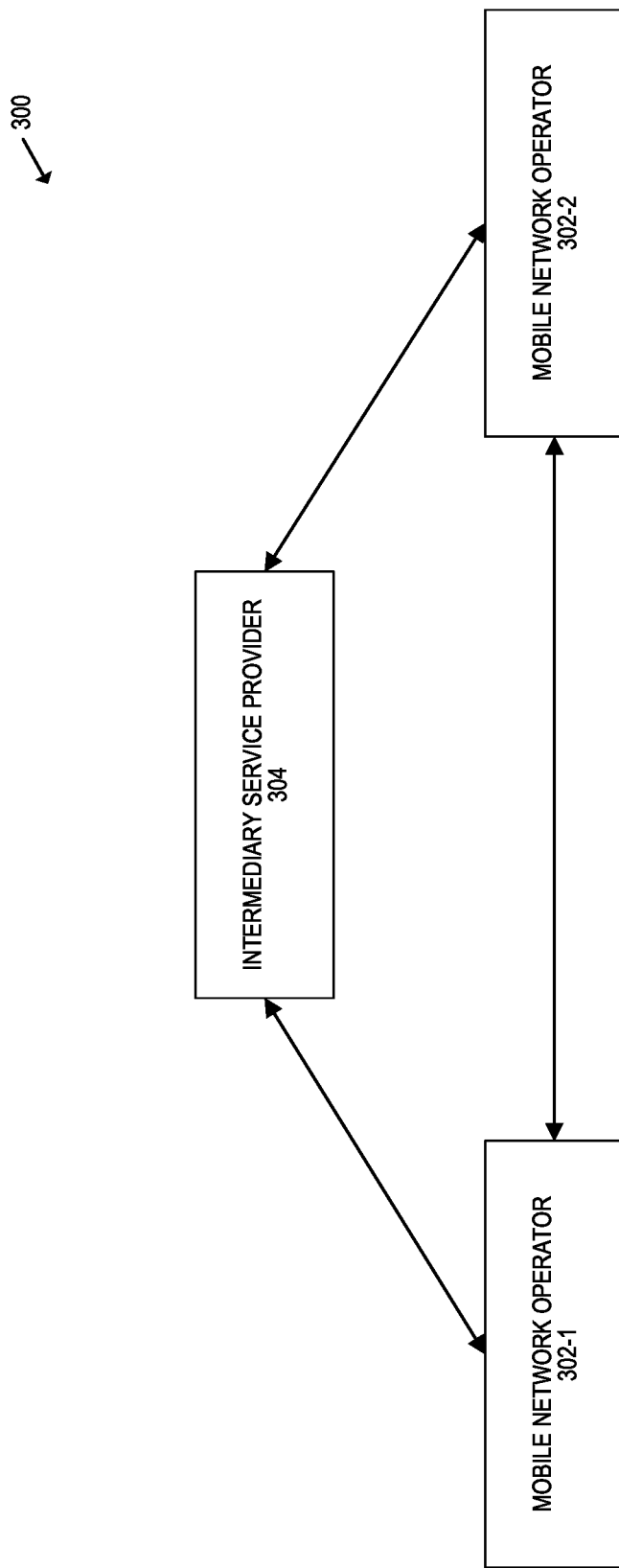
FIG. 3 is a block diagram that illustrates interconnections of interworking networks to support roaming services.

FIG. 3 is a block diagram 300 that illustrates interconnections of networks that support interworking services and/or roaming devices. Networks that are interworking are operable to support one or more services of the other. For example, a first network can operate a service that a second network can access and support for subscribers of the first or second networks. In contrast, roaming refers to one network supporting a wireless device of the other network. For mobile operators 302-1 and 302-2, roaming devices can be classified as inbound or outbound. An inbound roaming service allows subscribers from an operator to access a local network and services of another operator. An outbound roaming service allows subscribers from an operator's local network to access the other operator's network and services.

To ensure service and roaming continuity, agreements are typically formed between operator networks. For example, agreements between the operators 302-1 and 302-2 set policies to control network access for roaming subscribers and manage shared services. Roaming agreements can stipulate authentication, authorization, and billing for visiting subscribers, and minimal safety standards. The operators 302-1 and 302-2 can connect to each other directly or through an Intermediary service provider 304. A direct interconnection is through public networks or private lines that facilitate interconnections, for example. In one example, the intermediary service provider 304 establishes interworking or roaming networks through which different operator networks connect.

In operation, each of the operators 302-1 and 302-2 collects and maintains information regarding security capabilities and vulnerabilities of network services or devices including, for example, wireless devices of respective subscribers. However, the operators 302-1 and 302-2 typically do not have access to security data of the other, or at least access to the same extent of the security data. Examples of security data include a configuration of a network service or a network device (e.g., subscriber's wireless device), relate to network traffic (e.g., patterns indicative of malicious traffic), authorization information, authentication information, or account (e.g., charging) information, and any other data that directly impacts network security or is indicative of a vulnerability or malicious activity. This information asymmetry results in various problems for interworking services, inbound roaming, and outbound roaming.

In one example, security data is collected as VRT data from the operators 302-1 and 302-2 or is converted to VRT data before being exchanged between networks. The security data of wireless telecommunications networks includes, for example, vulnerabilities and capabilities for hardware, software, and/or services that support networks and subscriber devices. For example, network capabilities can include different resources that monitor malicious activity. The resources can vary by type and scale of deployment. Examples include types and models of network devices, version of software, configurations, and functional states. For example, one operator can deploy a monitoring tool across particular types of known vulnerable wireless devices whereas another operator can deploy a monitoring tool for hotspots. These differences mean that roaming devices may have vulnerabilities in one network but not another.

The system can automatically adapt to security data from sources including the operators 302-1 and 302-2, vendors, and/or publicly available information. The system collects network-specific security data including an inventory or statistics of network assets. The security data can include information about hardware, software, and configurations (versions, settings, etc.). In one example, vendors of the assets can publish information of discovered vulnerabilities in cybersecurity vulnerabilities and exposures (CVEs), which are in different formats. The system can also collect security data from public sources such as the National Institute of Standards and Technology (NIST)'s national vulnerability database (NVD), which receives security data from vendors and provides common names for identified problems. As such, the system can collect security data directly from network operators (e.g., operators 302-1 and 302-2) and through intermediary sources (e.g., intermediary service provider 304).

The system aggregates the security data in a database and/or creates individual profiles, often made up of thousands of pieces of data, for purposes of allowing network operators to manage the threat of cyberattacks that result from interworking and roaming devices. In one example, the system can manage the security data as VRT data having a common format. Moreover, the system can use natural language processing (NLP) along with machine learning (ML) to adaptively identify vulnerabilities by mapping security data with network-specific information. The system can also include tools for classification and risk valuation, including an estimation of a financial risk to a network caused by a VRT. As a result, network operators can readily query for security data of other networks and identify security risks posed by roaming devices. The system can prioritize VRTs to identify certain services of each network that require additional security protections and then broadcast that information to the networks. Thus, the system can mediate the exchange of security data to mitigate potential cyberattacks.

To service a network, the system can search for vulnerabilities across different networks and provide suggested updates that are applicable to one network given the security data of other networks. Because of the lack of uniformly available network-specific information, networks cannot accurately identify services or resources that need updating to secure interworking and roaming operations. For example, a network can learn of a connection vulnerability for an XYZ-type wireless device on a home network and configuration information to avert the vulnerability. A network may support a service for a visiting XYZ-type wireless device without implementing the same connection configuration. Hence, security measures for interconnected networks are uncoordinated, inconsistent, and unreliable particularly with interworking networks and for roaming devices.

Moreover, the security data of different networks does not necessarily have a consistent format. In particular, the security data is network-implementation specific such that implementing a common security solution is ineffective to implement and manage across diverse networks. For example, one network may process vulnerability information in a machine-readable format, which is often misinterpreted. On the other hand, security data in human-readable format requires a human to manually analyze and determine whether information is relevant to a network. The analyst needs to review a source of the advisory and match that information to interworking networks including roaming devices. Given the cost-prohibitive nature of performing human reviews, the routine use of human analysts is cost-prohibitive for many network operators.

The system can classify and score VRTs to produce a number that reflects severity of impact on a network. The numerical score can be translated into a qualitative representation (e.g., low, medium, high) to help an operator assess and prioritize VRT management processes. Based on the classification and score, the system can update a tracker and inform networks of specific risks. The system can repeat the same analysis to reassess VRTs and ensure that a network is informed of current updates. The system can perform an analogous analysis for each type of VRT.

The database maintains network-specific information about networks including, for example, device capabilities and vulnerabilities of subscriber devices. For example, the database can receive and store version data of hardware and software assets, as well as configuration information from networks. The network-specific information can be transferred from the database to a learning component and/or mapping component. For example, the database can extract network-specific information from tables on a periodic basis (e.g., once per day). The learning component can transform the network-specific information with a machine learning (ML) process that includes a data cleaning function, merging of different sources, and adaptive remapping.

The mapping component can adaptively map VRTs to network-specific information to identify any potential risk based on, for example, the type of network asset and version described by the VRT. For example, the mapping component can load the collected VRT information and network-specific information to staging tables and update working tables for any new or changed information. The matching component matches information of telecommunications assets in the vulnerability information with the network-specific information. For example, the matching component can match a device type, version, and/or configuration of one wireless devices in the VRT information to network-specific information.

The VRT information that matches network-specific information can feed a classification component to classify identified vulnerabilities. The output of the classification component is then fed to a risk valuation component to determine the scope of the risk and/or the degree of the risk due to the VRT data. The output of the risk valuation component is fed to a results database. The classification component and the risk valuation component can transform data in accordance with an ML process.

The results of the VRT analytics are available to networks in a variety of ways over a variety of means such as a graphical user interface (GUI). In some embodiments, the results are loaded to a cloud-based database. For example, a dashboard can provide access to the results database. In another example, a text mining component extracts text from the results database for a search index that is accessible from the web GUI. As such, a network can readily access analytics information rather than being tasked to process vulnerability information manually.

Cybersecurity System for Interworkinq Networks

Figure 4:
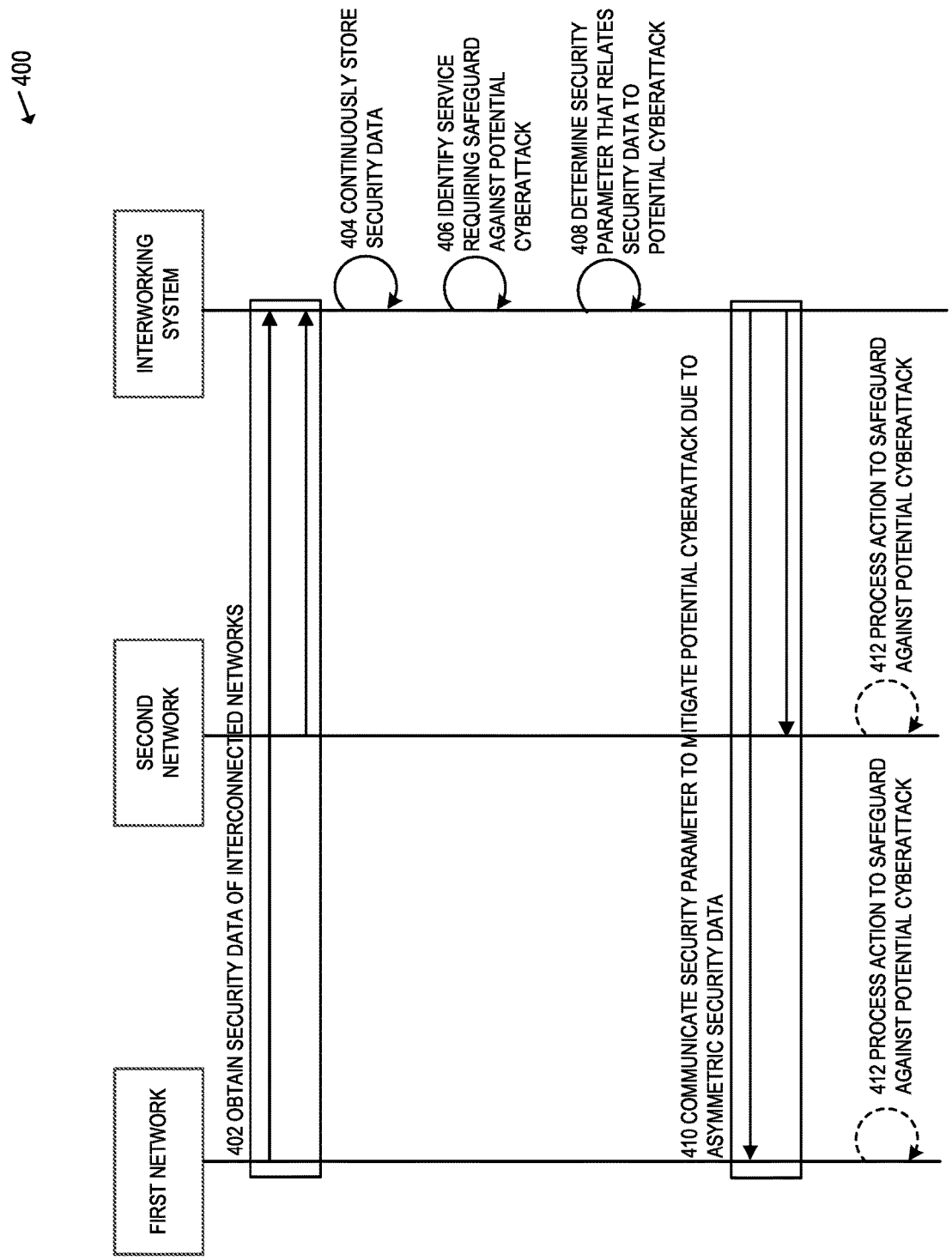
FIG. 4 is a flow diagram that illustrates a method performed by an interworking system to thwart a cyberattack that arises due to asymmetric security information between interconnected networks.

FIG. 4 is a flow diagram that illustrates a method 400 performed by a cybersecurity system ("system") that is configured to thwart a cyberattack that arises due to asymmetric information between interworking networks. The two interconnected networks are managed by different network operators and are configured to support one or more services for wireless devices. A first network can operate a service that a second network can access and support for subscribers of the first or second networks. For example, a first network can be configured to support a wireless standard (e.g., 3GPP standard) to permit a wireless device to access the first network. A second network can access information to borrow the service for wireless devices of the first network or the second network. In some implementations, the system is administered by one of the interconnected networks or a third-party service provider (e.g., intermediary service provider 304) that can generate revenue by mediating the exchange of security information for a fee. For example, a third-party server (e.g., not managed by the interconnected networks) can operate one or more servers that are configured to collect and exchange the security information of the interconnected networks.

In one example, the intermediary service provider can perform the detection and prevention of a cyberattack with secured links between the interconnected networks and the intermediary service provider. The intermediary service provider can be located on secured physical location or in secured cloud network/premise (e.g., virtual network). The intermediary service provider can have redundancy to provide backup and availability in case of link failure/outage.

At 402, the system obtains security data of each of two interconnected networks in real-time or near real-time. The visibility of the security data is asymmetric between the interconnected networks, which have different network operators and are configured to support one or more services for wireless devices. For example, the system can query each of the interconnected networks for information regarding a security capability or vulnerability of a wireless service. In response to the query, the interworking system receives security data including different capabilities or vulnerabilities for the different interconnected networks. For example, the system can collect first security data of a first network and second security data of a second network. The first network has greater visibility of the first security data compared to the second security data and the second network has greater visibility of the second security data compared to the first security data.

In another example, the system can look for both real-time and non-real time aspects, where real-time is related to immediate access for verification/detection while non-real time is related to historic information/patterns of the traffic, trends and predictions to add additional layers of confirmation of attacks or misinterpretations of attacks. The non-real-time data allows network engineers to design/implement changes/additions/deletions of detection methods, protection methods based on changes to the vulnerability trends, and technology landscapes of the system At 404, the system continuously stores security data of the interconnected networks at one or more memories of the system in real-time or near real-time. The system can refresh the memories with updated security data and communicate an indication of the updated security data to the interconnected networks. For example, an intermediary system can maintain a logical memory structure for each of the interconnected networks, where each logical memory structure is configured to store capabilities or vulnerabilities of the network or its services. The system can obtain or convert the security data into vulnerability-risk-threat (VRT) information that characterizes a potential cyberattack in relation to a vulnerability parameter, a risk parameter, and a threat parameter. The vulnerability parameter relates to a susceptibility to the cyberattack, the risk parameter relates to a scope of the cyberattack, and the threat parameter relates to a source of the cyberattack. For non-real-time aspects, the intermediary system could manage the memories and keep track of historic information from both networks. In addition, the networks could also keep track of their historic information and feed it to the intermediary system when necessary (e.g., to help optimize latency/parallel compute aspects to thus help the intermediary system make decisions faster).

At 406, the interworking system identifies a service of the interconnected networks that requires a safeguard against a potential cyberattack. The service is identified based on the security data, which could relate to, for example, whether the service is for a particular type of device (e.g., Android or iOS). In one example, the service includes a connection operation to establish a connection between the type of wireless device and an interconnected network. Another example of a service includes a handoff operation between the interconnected networks. The interworking system can process the security data by comparing capabilities of the networks relative to one or more services and use safeguards known to secure one network, to inform how to safeguard the other network. For example, a second network may be susceptible to a cyberattack because of an outdated hardware or software component that does not securely support a service of the first network or because one network lacks a security resource of the other network. For example, a first network may implement a particular service that has a known security vulnerability, which a second network would benefit from knowing when a wireless device on the second network seeks to access and use the particular service. In another example, the security data can indicate that a wireless device connected to a network through a NAN is running obsolete code or that had potentially compromised security settings.

At 408, the system determines a security parameter that relates the security data to the potential cyberattack. An example of a security parameter includes a configuration or setting to support a service. Examples of the security parameter include authentication, authorization, or account information, a setting or configuration for a service, operation, or application to safeguard against a potential cyberattack. The security parameter can be selected by the system based on the security data and, in some examples, considering the current settings or configurations of one of the networks, or nodes within the network such as a NAN. As such, a security parameter can depend on characteristics of a wireless service relative to different networks. In another example, the security parameter includes a classification of the subscriber associated with the wireless service such as an indication of a low, medium, or high threat.

At 410, the system communicates security information including the security parameter to the interconnected networks, which, when adopting the security parameter, safeguard the interconnected networks against the potential cyberattack. The security information can include other information such as an indication of the service that needs safeguarding. In one example, the interworking system can broadcast at least an indication of security information to the interconnected networks, which enables simultaneous and uniform adoption as a common safeguard for a service.

At 412, either or both interconnected networks can process one or more actions to safeguard against a potential cyberattack. An example of an action includes denying or granting a service or restricting the scope of the service for a wireless device. The action can designate a temporary effect that expires at the end of a time period. For example, the action can grant temporary permission to connect to a network (e.g., for two hours). Another example includes monitoring network traffic of a susceptible wireless service. The actions can be related to the security parameter that was identified based on the security data. For example, the system can identify a most frequently used (MFU) security parameter or a more recently used (MRU) security parameter. An MFU and MRU security parameter may be associated with an action that is communicated as a suggestion to a network. For example, the system can communicate an action to a first network to mitigate the susceptibility for a cyberattack when the wireless device connects or attempts to connect to a service of a second network based on actions known for MFUs or MRUs of a second network.

Cybersecurity System for Inbound Roaming

An inbound roaming system ("inbound system") of a wireless telecommunications network allows a network operator of a visited network to deny or allow access to the visited network and/or determine a scope of granted access for roaming devices. The inbound system can detect, based on security data collected of the wireless device on a home network, a potential cyberattack that is enabled by the roaming device. In one example, the home network maintains a UDM database that stores subscriber profiles including security data for associated wireless devices, capabilities, services, and the like. The home network can provide security information directly to the visited network or indirectly through a mediator system when queried by the visited network. As such, the visited network can dynamically adapt for a roaming device based on the security information of the home network.

Figure 5:
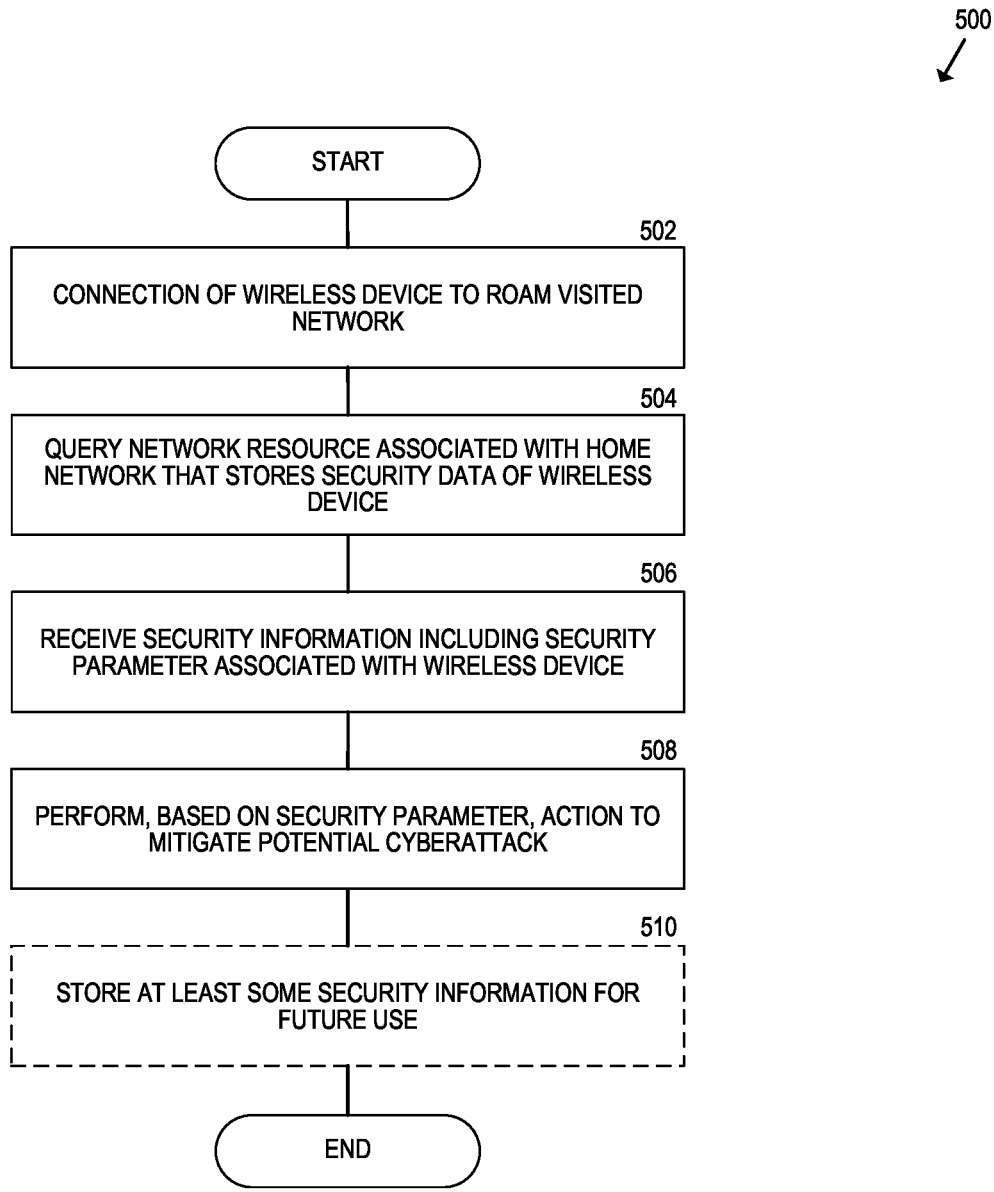
FIG. 5 is a flowchart that illustrates a method performed by an inbound roaming system of a visited network to thwart a potential cyberattack.

FIG. 5 is a flowchart that illustrates a method 500 performed by the inbound system of a visited network to thwart a cyberattack. In particular, the visited network can dynamically defend against cyberattacks enabled by roaming devices. In some examples, the inbound system is administered by the visited network or by a third-party service that generates revenue by providing security information to visited networks for a fee.

At 502, the inbound system processes a connection of a wireless device to roam on the visited network. For example, the inbound system can receive an indication of a connection request or an indication of an established connection. The wireless device is subscribed to a home network, and the home network stores security data of the wireless device (e.g., VRT data). The security data is stored in a logical memory structure per subscriber, wireless device, or groups thereof. The logical memory structure is configured to store capabilities or vulnerabilities in sharable profiles for networks. In one example, a profile stores a most recent configuration of a connection of a wireless device to a home network, which can be transferred to a visited network to aid in a security configuration. In another example, the inbound system detects a handoff of a wireless device to a visited network from another network. In yet another example, the inbound system receives a message or notification of the roaming device directly from the visited network.

At 504, the inbound system queries a network resource that stores or has access to security information of the wireless device. The network resource includes a database administered by the home network or by an entity other than the home network and the visited network (e.g., a third party). For example, the inbound system can query the home network to request security information including a security parameter that aids in mitigating a potential cyberattack enabled by the roaming device.

The query can also include a payment of a fee in exchange for the security information. The fee is an example of a condition that, in some implementations, must be satisfied to obtain security information. In one example, a payment for a fee is stored along with a call data record (CDR), which could be used to verify that the condition has been satisfied. Another example includes a condition for requesting the security information within a time period after the wireless device connects or seeks to connect to the visited network. Limiting the time period to, for example, 1 minute, can mitigate the risk that the visited network is maliciously collecting security information for reasons other than to secure roaming on the visited network.

In one example, the system detects a vulnerability of a network based on timestamps of protocol messages that must be communicated within threshold time intervals. An example includes RRC messages where a connection request is followed by a response. The system can detect a potential cyberattack if the request/response times exceed 1-2 ms, or there is a timing mismatched such as an acknowledgement being received before the request is communicated or a message takes too long to reach a destination (e.g., exceeds a threshold). The system could assume vulnerabilities were caused by a rogue device trying to randomly access/intercept the network.

Similarly, the system can use location information associated with protocol messages to detect a vulnerability of a network. For example, messages communicated by a roaming device are checked for their source locations based on the GPS coordinates of the associated roaming device. The system assumes that the same roaming device sent two messages when their source locations are within a threshold distance. On the other hand, when two messages are presumed to originate from the same roaming device but their respective source locations are geographically far apart (e.g., exceeding the threshold distance), the system can detect this inconsistency as an indication of a vulnerability that, for example, there is more than one device sending the messages (e.g., a suspected coordinated attack or another device that is impersonating the roaming device).

Examples of the security parameter include a setting or configuration for a service, operation, or application to safeguard against a potential cyberattack. The security parameter can be selected by the inbound system based on the security data obtained from the home network and, in some examples, considering the current settings or configurations of the visited network. In one example, the security data includes VRT data that characterizes a potential cyberattack based on a vulnerability parameter that relates to a susceptibility to the cyberattack, a risk parameter that relates to a scope of the cyberattack, and a threat parameter that relates to a source of the cyberattack. As such, a security parameter can depend on an operation, capability, and/or configuration of the wireless device and the home network relative to different visited networks. In another example, the security parameter includes a classification of the subscriber associated with the wireless device such as an indication of a low, medium, or high threat.

At 506, in response to the query, the inbound system receives an indication of a security parameter associated with the wireless device. The security parameter relates the security data of the wireless device to a potential cyberattack enabled by the wireless device when roaming on the visited network. For example, the inbound system queries a database administered by the home network or a third-party for a configuration of the home network to mitigate the potential cyberattack on the visited network. In another example, the visited network pays a fee the satisfies the condition required to access the security information. In another example, the inbound roaming system can exchange security information between a visited network and a home network (e.g., including capabilities or vulnerabilities of subscribers) for an additional fee or in lieu of paying a fee to satisfy the condition.

At 508, the inbound system performs, based on the security parameter, an action that affects roaming by the wireless device on the visited network or modifies a security resource of the visited network to mitigate the potential cyberattack enabled by the wireless device. For example, the action can include denying or granting a connection request to roam on the visited network, or restrict a scope of roaming on the visited network. Another example of an action includes causing the inbound system to monitor the network traffic of the wireless device while roaming on the visited network. In yet another example, the action includes configuring a security resource of the visited network in accordance with a configuration of the home network. In other words, the visited network can adopt a configuration of the home network for a roaming device. In one example, the security information can include a most frequently used (MFU) or a more recently used (MRU) security parameter associated with the wireless device. The visited network can prioritize cybersecurity protections based on the MFU or MRU data.

At 510, the inbound system optionally stores at least a portion of the security information at a local database. When the inbound system requires security information due to, for example, another connection request for the same wireless device to roam on the same visited network, the inbound system detects that the same wireless device previously roamed on the visiting network. The inbound system can then more rapidly query the local database for security information to mitigate a potential cyberattack rather than querying the network resource again.

Cybersecurity System for Outbound Roaming

An outbound roaming system ("outbound system") of a wireless telecommunications network manages security data of subscribers. The outbound system can classify a home network's subscribers or associated wireless devices that pose security risks and can make that information available for visited networks that host roaming devices of the home network. With this security information, the visited networks can decide whether to grant/deny access and determine a safe scope of granted access. In one example, a home network predicts or detects that one of its subscribers will/is roaming a visited network and offers security data of the roaming device for purchase by the visited network. As such, the visited network can dynamically adapt based on the security data of the home network and/or configure the visited network accordingly.

Figure 6:
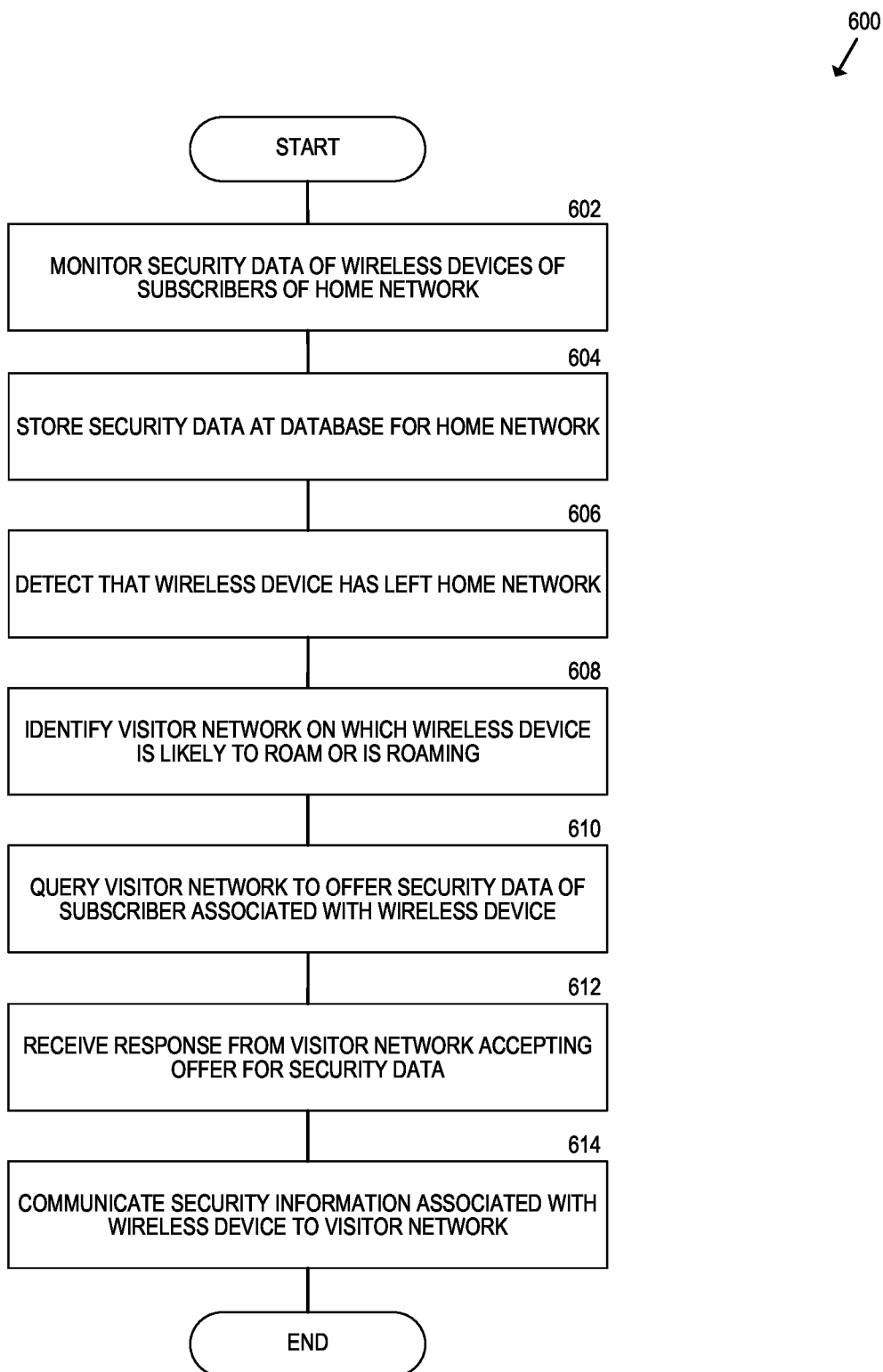
FIG. 6 is a flowchart that illustrates a method performed by an outbound roaming system to aid a visited network in thwarting a potential cyberattack.

FIG. 6 is a flowchart that illustrates a method 600 performed by the outbound system to aid a visited network in thwarting a cyberattack. In particular, the visited network can dynamically defend against cyberattacks enabled by roaming devices. In some examples, the outbound system is administered by the home network as a service for visited networks or is a third-party service to, for example, generate revenue by disclosing security information to visited networks for a fee.

At 602, the outbound system monitors security data of wireless devices of subscribers of the home network in real-time or near real-time (or an analogous non-real-time as described earlier regarding an inbound system). For example, the outbound system can intercept VRT data that characterizes communications or operations of a wireless device based on a vulnerability parameter indicative of susceptibility to a cyberattack, a risk parameter indicative of a scope of the cyberattack, and a threat parameter indicative of a source of the cyberattack.

At 604, the outbound system stores the security data at a database for the home network that is administered by the home network or the third-party service. The outbound system maintains a logical memory structure per subscriber, wireless device, or groups thereof. The logical memory structure is configured to store capabilities or vulnerabilities as a sharable profile for visited networks. In one example, a profile stores a most recent configuration of a connection of the wireless device to the home network, which can be transferred to a visited network to aid in connection configurations.

At 606, the outbound system detects that a wireless device of the home network has left the home network. For example, the home network can detect a handoff to a network other than the home network and communicate an indication of the handoff to the outbound system. In another example, the outbound system receives a message or notification of the roaming device from the visited network. As such, the outbound system infers that the wireless device has left the home network and is supported by the visited network.

At 608, the outbound system identifies a visited network on which the wireless device is likely to roam or is actively roaming. That is, the outbound system can predict and/or identify the visited network on which the wireless device is likely to roam or is currently roaming. In one example, the visited network is identified based on a most recent geographic location of the wireless device relative to when the outbound system detected that the wireless device left the home network.

At 610, the outbound system queries the visited network to offer security information including a security parameter that aids in mitigating the risk of a potential cyberattack enabled by the roaming device. The query can also include a request for payment of a fee in exchange for the security information to aid in mitigating the potential cyberattack. The fee is an example of a condition that, in some implementations, must be satisfied to disclose security information. In one example, a payment for a fee is stored along with a call data record (CDR), which could be used to verify that the condition has been satisfied. Another example includes a time period in which the request was communicated. For example, a condition can require acceptance by the visited network within a time period after communicating the offer, to mitigate the risk that the visited network is maliciously collecting security information.

Examples of the security parameter include a setting or configuration for a service, operation, or application to safeguard against a potential cyberattack. The security parameter is selected based on the security data obtained from the home network and, in some examples, considering the current settings or configurations of the visited network. As such, a security parameter necessary for one visited network may be unnecessary for another visited network depending on an operation, capability, and/or configuration of the wireless device and the home network relative to the different visited networks. In another example, the security parameter includes a classification of the subscriber associated with the wireless device such as an indication of a low, medium, or high threat.

At 612, the outbound system receives a response from the visited network, which accepts the offer for the security information for the wireless device or associated subscriber. The response can include an indication that the payment was made for the security information. For example, the response can include a credit to the service provider of the outbound system by the visited network. In other example, the response can include information about the visited network, which can be used by the outbound system to determine and suggest a suitable or optimal security parameter.

At 614, the outbound system communicates the security information associated with the wireless device to the visited network. In one implementation, the security information is communicated upon satisfying the required condition (e.g., payment of the fee). Thus, the security information is based on the security data obtained from the home network and enables the visited network to adopt a security parameter that mitigates the risk of the potential cyberattack enabled by the roaming device. In one example, the security parameter enables the visited network to adopt a configuration of the home network such as a most recent connection configuration of the wireless device used by the home network. More generally, the security information can include a most frequently used (MFU) or a more recently used (MRU) security parameter associated with the wireless device. The visited network can prioritize cybersecurity protections based on the MFU or MRU data.

Suitable Computer System

Figure 7:
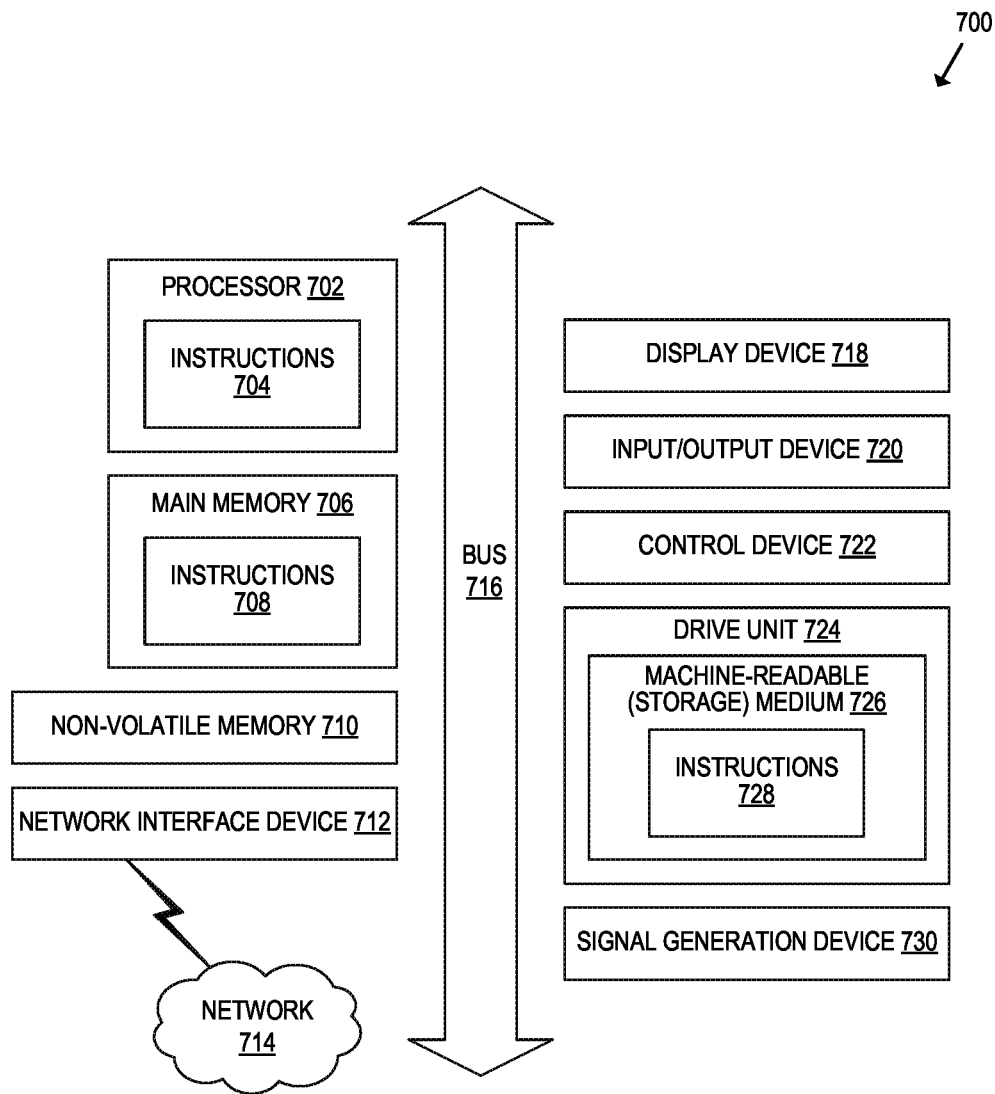
FIG. 7 is a block diagram that illustrates an example of a computing system in which at least some operations described herein can be implemented.

FIG. 7 is a block diagram that illustrates an example of a computer system 700 in which at least some operations described herein can be implemented. For example, components of the system 100 and components discussed with respect to FIGS. 1-6 can include or host components of the computing system 700.

As shown, the computer system 700 can include one or more processors 702, main memory 706, non-volatile memory 710, a network interface device 712, video display device 718, an input/output device 720, a control device 722 (e.g., keyboard and point device), a drive unit 724 that includes a storage medium 726, and a signal generation device 730 that are communicatively connected to a bus 716. The bus 716 represents one or more physical buses and/or point-to-point connections that are connected by appropriate bridges, adapters, or controllers. The bus 716 therefore can include a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus (also referred to as "Firewire"). Various common components (e.g., cache memory) are omitted from FIG. 7 for brevity. Instead, the computer system 700 is intended to illustrate a hardware device on which components illustrated or described relative to the examples of FIGS. 1-6 and any other components described in this specification can be implemented.

The computer system 700 can take any suitable physical form. For example, the computing system 700 may share a similar architecture as that of a personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 700. In some embodiment, the computer system 700 can be an embedded computer system, a system-on-chip (SOC), a single-board computer system (SBC) or a distributed system such as a mesh of computer systems or include one or more cloud components in one or more networks. Where appropriate, one or more computer systems 700 can perform operations in real-time, near real-time, or in batch mode.

The processor 702 can be, for example, a central processing unit, a conventional microprocessor (e.g., Intel Pentium processor). The memory (e.g., main memory 706, non-volatile memory 710, machine-readable medium 726) can be local, remote, or distributed. Although shown as single medium, the machine-readable medium 726 can include multiple media (e.g., a centralized/distributed database and/or associated caches and servers) that store one or more sets of instructions 728. The machine-readable (storage) medium 726 can include any medium that is capable of storing, encoding, or carrying a set of instructions for execution by the computing system 700. One of skill in the relevant art will recognize that the machine-readable medium 726 can include any type of medium that is accessible by the processor. The machine-readable medium 726 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

In general, the routines executed to implement the embodiments of the disclosure may be implemented as part of an operating system or a specific application, component, program, object, module, or sequence of instructions (collectively referred to as "computer programs"). The computer programs typically comprise one or more instructions (e.g., instructions 704, 708, 728) set at various times in various memory and storage devices in computing device(s). When read and executed by the processor 702, the instruction(s) cause the computing system 700 to perform operations to execute elements involving the various aspects of the disclosure.

Although embodiments have been described in the context of fully functioning computing devices, the various embodiments are capable of being distributed as a program product in a variety of forms. Examples of machine-readable storage media, machine-readable media, or computer-readable media include recordable-type media such as volatile and non-volatile memory devices 710, removable flash memory, hard disk drives, optical disks, and transmission-type media such as digital and analog communication links.

Software is typically stored in the non-volatile memory and/or the drive unit 724. When software is moved to the memory for execution, the processor 702 will typically make use of hardware registers to store values associated with the software, and local cache that, ideally, serves to speed up execution. As used herein, a software program is assumed to be stored at any known or convenient location (e.g., non-volatile storage, hardware registers) when the software program is referred to as "implemented in a computer-readable medium." A processor can be "configured to execute a program" when at least one value associated with the program is stored in a register readable by the processor.

The network interface device 712 enables the computing system 700 to mediate data in a network 714 with an entity that is external to the computing system 700 through any communication protocol supported by the computing system 700 and the external entity. Examples of the network interface device 712 include a network adaptor card, a wireless network interface card, a router, an access point, a wireless router, a switch, a multilayer switch, a protocol converter, a gateway, a bridge, bridge router, a hub, a digital media receiver, and/or a repeater.

Further, the interface device 712 can include a firewall that governs and/or manages permission to access/proxy data in a computer network and tracks varying levels of trust between different machines and/or applications. The firewall can be any number of modules having any combination of hardware and/or software components able to enforce a predetermined set of access rights between a particular set of machines and applications, machines and machines, and/or applications and applications (e.g., to regulate the flow of traffic and resource sharing between these entities). The firewall may additionally manage and/or have access to an access control list that details permissions including the access and operation rights of an object by an individual, a machine, and/or an application, and the circumstances under which the permission rights stand.

Examples of the I/O devices 720 include a keyboard, a mouse or other pointing device, disk drives, printers, a scanner, and other input and/or output devices, including a display device. Examples of the display device 718 can include a cathode ray tube (CRT), liquid crystal display (LCD), or any display device.

In operation, the computer system 700 can be controlled by operating system software that includes a file management system, such as a disk operating system. One example of operating system software with associated item management system software is the family of operating systems known as Windows® from Microsoft Corporation of Redmond, Wash., and their associated item management systems. Another example of operating system software with its associated item management system software is the Linux™ operating system and its associated item management system. The item management system is typically stored in the non-volatile memory and/or drive unit and causes the processor to execute the various acts required by the operating system to input and output data and to store data in the memory, including storing items on the non-volatile memory and/or drive unit.

The techniques introduced here can be implemented by programmable circuitry (e.g., one or more microprocessors), software and/or firmware, special-purpose hardwired (i.e., non-programmable) circuitry, or a combination of such forms. Special-purpose circuitry can be in the form of one or more application-specific integrated circuits (ASICs), programmable logic devices (PLDs), field-programmable gate arrays (FPGAs), etc.

Some portions of the detailed description can be presented in terms of algorithms and symbolic representations of operations on data bits within a computer memory. These algorithmic descriptions and representations are the means used by those skilled in the data processing arts to most effectively convey the substance of their work to others skilled in the art. An algorithm can refer to a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems can be used with programs in accordance with the teachings herein, or it can prove convenient to construct more specialized apparatus to perform the methods of some embodiments. The required structure for a variety of these systems will appear from the description below. In addition, the techniques are not described with reference to any particular programming language, and various embodiments can thus be implemented using a variety of programming languages.

In some circumstances, operation of a memory device, such as a change in state from a binary one to a binary zero or vice-versa, for example, can comprise a transformation, such as a physical transformation. With particular types of memory devices, such a physical transformation can comprise a physical transformation of an article to a different state or thing. For example, but without limitation, for some types of memory devices, a change in state can involve an accumulation and storage of charge or a release of stored charge. Likewise, in other memory devices, a change of state can comprise a physical change or transformation in magnetic orientation or a physical change or transformation in molecular structure, such as from crystalline to amorphous or vice versa. The foregoing is not intended to be an exhaustive list in which a change in state for a binary one to a binary zero or vice-versa in a memory device can comprise a transformation, such as a physical transformation. Rather, the foregoing is intended as illustrative examples.

REMARKS

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where the context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list.

While specific examples of technology are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel, or may be performed at different times. Further, any specific numbers noted herein are only examples such that alternative implementations can employ differing values or ranges.

Details of the disclosed embodiments may vary considerably in specific implementations while still being encompassed by the disclosed teachings. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain embodiments are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will begin with the words "means for." However, the use of the term "for" in any other context is not intended to invoke a similar interpretation. The applicant reserves the right to pursue such additional claim forms in either this application or in a continuing application.

We claim:

1. At least one computer-readable storage medium, excluding transitory signals and carrying instructions, which, when executed by at least one data processor of a system, cause the system to:
 obtain, in real-time or near real-time, security data of interconnected wireless networks including a first wireless network and a second wireless network,
  wherein visibility of the security data is asymmetric for each interconnected wireless network relative to the other interconnected wireless network,
  wherein the interconnected wireless networks are managed by different wireless service providers, and wherein the first wireless network operates one or more services that support a wireless standard that the second wireless network can use to support a wireless device of the first wireless network or of the second wireless network;

continuously store the security data of the interconnected networks at one or more memories of the system;

identify a particular service of the first wireless network that is accessible by the second wireless network and requires a safeguard against a potential cyberattack based on the security data;

determine a security parameter that relates the security data to the potential cyberattack; and communicate security information including the security parameter to the second wireless network, which, when adopting the security parameter, safeguards the interconnected networks against the potential cyberattack, wherein the security information includes an indication of the particular service.

2. The at least one computer-readable storage medium of claim 1, wherein the wireless standard is a 3GPP standard, and wherein the system is further caused to, prior to communicating the security information:

identify an action executable by the second wireless network to safeguard against the potential cyberattack, wherein the security information includes an indication of the identified action.

3. The at least one computer-readable storage medium of claim 1, wherein the interworking system is further caused to, prior to communicating the security information:

convert the obtained security data into vulnerability-risk-threat (VRT) data that characterizes the security data in relation to:
 a vulnerability of an interconnected network to the cyberattack,
 a risk of the cyberattack to the interconnected network, and
 a threat of the cyberattack to the interconnected network.

4. The at least one computer-readable storage medium of claim 1, wherein the security data indicates a susceptibility to the cyberattack, a scope of the cyberattack, and a source of the cyberattack.

5. The at least one computer-readable storage medium of claim 1, wherein the system is further caused to:

refresh the one or more memories of the system with updated security data; and communicate an indication of updated security information to the interconnected networks.

6. The at least one computer-readable storage medium of claim 1, wherein the system operates independent of the interconnected networks.

7. The at least one computer-readable storage medium of claim 1, wherein the system is further caused to, prior to communicating the security information:

identify a most frequently used (MFU) security parameter,
 wherein the security parameter corresponds to the MFU security parameter.

8. The at least one computer-readable storage medium of claim 1, wherein the system is further caused to, prior to communicating the security information:

identify a more recently used (MRU) security parameter, wherein the security parameter corresponds to the MRU security parameter.

9. The at least one computer-readable storage medium of claim 1, wherein the system is further caused to, prior to communicating the security information:

identify different actions for respective interconnected networks to safeguard against the potential cyberattack; and communicate indications of the different actions to thereby enable the respective interconnected networks to adopt the safeguard.

10. The at least one computer-readable storage medium of claim 1, wherein to communicate the security information comprises causing the system to:

broadcast the security information to thereby enable the interconnected networks to uniformly adopt the safeguard.

11. The at least one computer-readable storage medium of claim 1, wherein to obtain the security data of the interconnected networks comprises causing the system to:

query each of the interconnected networks for a security capability or vulnerability; and responsive to the query, receive the security data including different respective security capabilities or vulnerabilities for each of the interconnected networks.

12. The at least one computer-readable storage medium of claim 1, wherein the system is further caused to, prior to communicating the security information:

identify an action executable for one of the interconnected networks to safeguard against the potential cyberattack, wherein the action expires after a time period.

13. The at least one computer-readable storage medium of claim 1, wherein to continuously store the security data comprises causing the system to:

maintain a logical memory structure for each of the interconnected networks,
 wherein each logical memory structure is configured to store capabilities or vulnerabilities of a respective interconnected network; and compare the capabilities or vulnerabilities of each interconnected network to the potential cyberattack,
 wherein the service is identified based on the comparison.

14. The at least one computer-readable storage medium of claim 1, wherein the particular service includes a connection service to switch a connection of the wireless device between the interconnected networks.

15. A system that interconnects a first network and a second network, the system comprising:

a data processor; and a memory including instructions which, when executed by the data processor, cause the system to:

collect first security data of the first network and second security data of the second network,
 wherein the first network has greater visibility of the first security data compared to the second security data and the second network has greater visibility of the second security data compared to the first security data;

store the first security data in a first logical memory structure and the second security data in a second logical memory structure different from the first logical memory structure;

detect susceptibility for a cyberattack on the first network based on the second security data,
 wherein susceptibility for the cyberattack arises from a wireless service of the second network operable by the first network;

identify an action configured to mitigate the susceptibility for the cyberattack on the first network; and communicate the action to the first network to mitigate the susceptibility for the cyberattack when the wireless service is accessed by the first network.

16. The system of claim 15, wherein the first network is susceptible to the cyberattack based on a hardware component of a network device.

17. The system of claim 15, wherein the first network is susceptible to the cyberattack due to a security resource of the second network that is absent from the first network.

18. A method for mediating an exchange of security data between multiple interconnected networks, the method comprising:

monitoring security data of first and second interconnected networks in real-time or near real-time,
wherein the first and second interconnected networks are managed by different network operators, and
wherein one of the interconnected networks operate one or more wireless services that are accessible by the other interconnected network, and continuously storing the security data of the first or second interconnected networks at one or more memories accessible for the first and second interconnected networks;

identifying a particular service of the one interconnected network for the other interconnected network,
wherein the particular service requires additional security protection based on the security data; and broadcasting an indication of the particular service and the security data to the first or second interconnected networks and a security parameter that enables adoption of the additional security protection.

19. The method of claim 18, wherein the security data characterizes a susceptibility to a cyberattack, a scope of the cyberattack, and a source of the cyberattack, and wherein the method is performed by a system that operates independent of the interconnected networks.

20. The method of claim 18 further comprising, prior to broadcasting the indication of the particular service and the security data:

identifying, based on the security data, a most frequently used (MFU) security parameter or a more recently used (MRU) security parameter,
wherein the security parameter corresponds to the MFU or MRU security parameter.

* * * * *